(12) United States Patent
Bhargava et al.

(10) Patent No.: US 9,321,908 B2
(45) Date of Patent: Apr. 26, 2016

(54) METHODS FOR DISPERSING WATER SOLUBLE POLYMER POWDER

(71) Applicant: HERCULES INCORPORATED, Wilmington, DE (US)

(72) Inventors: Prachur Bhargava, Wilmington, DE (US); Konstantin A. Vaynberg, Cherry Hill, NJ (US)

(73) Assignee: HERCULES INCORPORATED, Wilmington, DE (US)

( * ) Notice: Subject to any disclaimer, the term of this patent is extended or adjusted under 35 U.S.C. 154(b) by 204 days.

(21) Appl. No.: 13/867,317

(22) Filed: Apr. 22, 2013

(65) Prior Publication Data
US 2013/0233205 A1    Sep. 12, 2013

Related U.S. Application Data

(63) Continuation-in-part of application No. 13/412,075, filed on Mar. 5, 2012.

(60) Provisional application No. 61/449,846, filed on Mar. 7, 2011.

(51) Int. Cl.
  *C08J 3/05*    (2006.01)
  *C08L 1/28*    (2006.01)

(52) U.S. Cl.
  CPC .... *C08L 1/28* (2013.01); *C08J 3/05* (2013.01); *C08L 1/284* (2013.01)

(58) Field of Classification Search
  CPC ............... C08L 1/28; C08L 1/284; C08J 3/05
  USPC ...................... 106/181.1, 184.1, 189.1, 198.1
  See application file for complete search history.

(56) References Cited

U.S. PATENT DOCUMENTS

| | | | |
|---|---|---|---|
| 2,879,268 A | 3/1959 | Jullander et al. | |
| 4,366,070 A | 12/1982 | Block | |
| 4,720,303 A * | 1/1988 | Soldatos | 106/181.1 |
| 5,837,864 A | 11/1998 | Andersson et al. | |
| 6,172,010 B1 * | 1/2001 | Argillier et al. | 507/102 |
| 6,197,100 B1 | 3/2001 | Melbouci | |
| 6,639,066 B2 * | 10/2003 | Bostrom et al. | 536/84 |
| 8,303,159 B2 | 11/2012 | Yu et al. | |
| 2003/0130500 A1 | 7/2003 | Schlesiger et al. | |
| 2005/0261490 A1 * | 11/2005 | Perplies et al. | 536/66 |
| 2007/0055057 A1 | 3/2007 | Brackhagen et al. | |
| 2007/0175361 A1 | 8/2007 | Bonney et al. | |
| 2011/0218678 A1 | 9/2011 | Sebben | |

FOREIGN PATENT DOCUMENTS

| | | |
|---|---|---|
| DE | 1039442 | 3/2004 |
| EP | 1316563 | 6/2003 |
| GB | 1161953 | 8/1969 |
| GB | 2126243 | 3/1984 |
| JP | 2000 063565 | 2/2000 |
| KR | 2010 0118801 | 11/2010 |
| WO | WO 95 30705 | 11/1995 |
| WO | 2012122153 | 9/2012 |

OTHER PUBLICATIONS

Schutte & Koerting, "Eductors and Syphons", (2007).*
Somasundaran, ed., Encyclopedia of Surface and Colloid Science, 2004 Update Supplement, (2004), p. 153.*
PCT/US2012/027836—International Search Report, mailed Jun. 4, 2012.*
International Search Report, "PCAT/US2013/043601", pp. 1-2, Nov. 12, 2013.
PCT/US2012/027826—International Search Report, mailed Jun. 4, 2012.

* cited by examiner

*Primary Examiner* — David M Brunsman
(74) *Attorney, Agent, or Firm* — Dunlap Codding, P.C.; Shaorong Chen

(57) ABSTRACT

The present invention relates generally to a method for dispersing a dry cellulose ether powder in an aqueous solution without forming lumps using powder handling and mixing devices. The cellulose ethers can be cross-linked with an aldehyde cross-linker. An acid or partially neutralized acid is used to improve the solubility.

19 Claims, 7 Drawing Sheets

METHODS FOR DISPERSING WATER SOLUBLE POLYMER POWDER

RELATED APPLICATION

This application is a continuation in part of U.S. application Ser. No. 13/412,075 filed on Mar. 5, 2012, which claims the benefit of U.S. Provisional Patent Application Ser. No. 61/449,846, filed Mar. 7, 2011, the entire contents of both of which are incorporated herein by reference in their entirety.

FIELD OF THE INVENTION

The present invention relates generally to water soluble polymer powder formulations, and more particularly, to water soluble cellulose ether formulations which are in powder forms suitable for direct addition to water-based systems to produce smooth, lump free solutions. The invention additionally concerns a process for producing the water soluble cellulose ether formulations in powder form suitable for direct addition to water-based systems. The water soluble cellulose ether powder formulations can be used in personal care, household care, building and construction materials, oilfield, pharmaceutical, food, and most particularly paint and coatings. The present invention further relates to methods for dispersing the water soluble cellulose ether powder with improved dispersing properties in powder handling and mixing devices.

BACKGROUND OF THE INVENTION

In many end use applications, water soluble polymers are received and initially handled by users as powders which are subsequently dissolved into various water-based systems. This, however, presents a technical challenge as water soluble polymer powders tend to lump when added to water-based systems. The problem arises from rapid hydration and swelling of the water soluble polymer powders upon addition to water-based systems. When water soluble polymer powders are added in bulk, particles of the water soluble polymer at the interface between powder phase and fluid phase begin to rapidly hydrate and swell. The swelling of water soluble polymer particles at the interface and the resulting particle jamming slows down fluid penetration into the interior of the powder phase. This process ultimately results in the creation of persistent, slowly dissolving gel agglomerates of various sizes. The formation of the agglomerates in addition to slowing down the rate of water soluble polymer dissolution, also results in the presence of undesired matter in one's formulation.

A number of approaches are known in the art that have been used in producing lump free dissolution of water soluble polymers. Among the commonly-used approaches are (a) slow addition of water soluble polymer powders, (b) pre-wetting of the water soluble polymer powders with water miscible solvent, and (c) blending the water soluble polymer powders with other dry materials prior to utilization. Each of the above mentioned approaches has a downside. For example, approach (a) greatly slows down powder utilization, approaches (b) and (c) may carry over substantial concentrations of additives which may have negative effects on the product to which the water soluble polymer product is added from either an environmental compliance or a performance standpoint.

Another approach used in suppressing lump formation during dissolution is based on using high shear induction equipment. In this approach, the water soluble polymer powders/water system mixtures are subjected to high shear that mechanically breaks lumps formed by the hydrating water soluble polymer powders into individual polymer particles. The shortcoming of this approach is that it requires dedicated equipment at the point of use.

A number of approaches, based on physical or chemical modification of water soluble polymer powders, have also been developed in order to attempt to provide for lump free dissolution of water soluble polymers. For example, U.S. Pat. No. 6,197,100 teaches the use of surfactants which when coated onto particle surfaces make the coated particles more easily dispersible. Patent application US2007/0175361A teaches a method of preparing dispersible water soluble polymers by spray drying water soluble polymer powders with water soluble salts or sugars or various polymers.

U.S. Pat. No. 2,879,268 teaches a method for improving dispersibility of powders by means of chemical modification of powder surface. The patent teaches the use of formaldehyde or dialdehydes to produce surface cross-linking which allows particle dispersion prior to its solubilization.

U.S. Pat. No. 6,639,066 B2 teaches the use of blended glyoxalated cellulose ethers with various electrolytic salts. The dry blends are taught to be suitable for preparing stable suspensions by adding the dry blends to water in a single step.

U.S. Pat. No. 4,720,303 teaches the use of blends of cellulose ethers with solid organic acids, such as citric acid, tartaric acid, oxalic acid, malonic acid and succinic acid, to produce dry blends suitable for thickening water-based systems without lump formation. However, blending cellulose ethers with solid organic acids has a detrimental effect on the cellulose ethers, especially hydroxyethyl cellulose. Such blends of solid organic acids and cellulose ethers decrease the blend's shelf stability which decreases the solubility of the polymer.

The need exists for an approach for suppressing lump formation of water soluble cellulose ethers during dissolution which does not require the use of specialized high shear induction equipment, or through the use of additives which are either detrimental to the ultimate end use or to the shelf life of the cellulose ether, but rather results in cellulose ether powders which are capable of rapid, lump free dissolution from a direct addition to water-based systems without the comprising shelf stability.

SUMMARY OF THE INVENTION

The present invention relates to a dry blend comprising up to about 99 wt % by weight of aldehyde-reactive water soluble cellulose ether treated with up to about 8 wt % of a cross-linker having at least one aldehyde moiety, and 20 wt % by weight or less of a weak acid which provides storage stability to the cross-linked cellulose ether.

The present invention also relates to a method of thickening water-based systems, preferably water-based systems having a viscosity higher than the viscosity of water. The method comprises the steps of adding a desired amount of a dry blend to a water-based system. The water-based system is subsequently mixed wherein a relatively lump free uniform thickened system is formed. The dry blend used in this method includes up to about 99 wt % by weight of a water soluble cellulose ether cross-linked with up to about 8 wt % by weight of a cross-linker having at least one aldehyde group, preferably glyoxal, and 20 wt % by weight or less of a weak acid which provides storage stability to the dry blend in powder form.

The present invention further relates to a method for dispersing the water soluble powder formulations with improved dispersing properties in powder handling and mixing devices.

The use of the formulation offers improved processing in these mixing devices. In addition, the present invention relates to a method for dispersing a water soluble cellulose ether powder with an acid stream in powder handing and mixing devices.

DETAILED DESCRIPTION OF THE INVENTION

Figure 1:
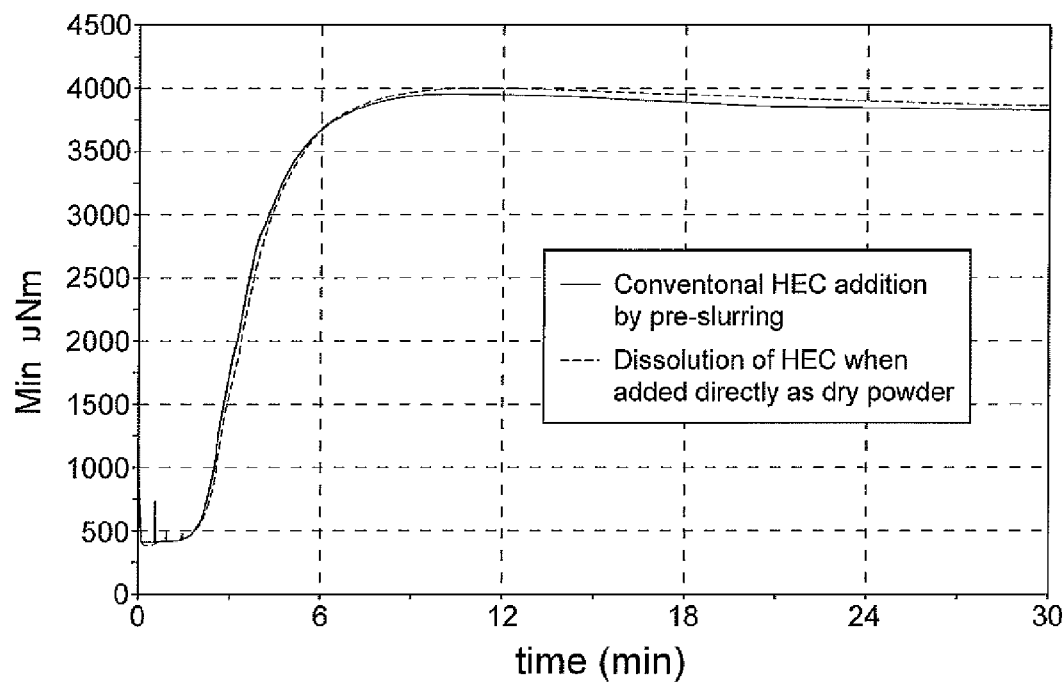
FIG. 1 is a graph which illustrates dissolution over time of glyoxalated HEC in pH8.5 100 mM Tris buffer by either pre-slurrying or directly adding the HEC as a dry powder.

The claimed invention relates to a formulation of polyaldehyde -reactive water soluble cellulose ether powders suitable for direct addition to water-based systems, preferably water-based systems having a viscosity greater than the viscosity of water, under moderate agitation where the formulation readily dispenses without lumps. The formulation includes a cellulose ether, a cross-linker and a powdered acid.

For the purposes of this application, "powder" shall mean a substance consisting of ground, pulverized or otherwise finely dispersed solid particles.

The cellulose ethers for use in the present invention include cellulose ethers which react with an aldehyde to form a hemiacetal, in particular hydroxyalkyl cellulose ethers. These can include, but are not limited to, hydroxyethyl cellulose (HEC), hydroxypropyl cellulose (HPC), water soluble ethylhydroxyethyl cellulose (EHEC), carboxymethyl cellulose (CMC), carboxymethylhydroxyethyl cellulose (CMHEC), hydroxypropylhydroxyethyl cellulose (HPHEC), methylcellulose (MC), methylhydroxypropyl cellulose (MHPC), methylhydroxyethyl cellulose (MHEC), carboxymethylmethyl cellulose (CMMC), hydrophobically modified carboxymethyl cellulose (HMCMC), hydrophobically modified hydroxyethyl cellulose (HMHEC), hydrophobically modified hydroxylpropyl cellulose (HMHPC), hydrophobically modified ethylhydroxyethyl cellulose (HMEHEC), hydrophobically modified carboxymethylhydroxyethyl cellulose (HMCMHEC), hydrophobically modified hydroxypropylhydroxyethyl cellulose (HMHPHEC), hydrophobically modified methyl cellulose (HMMC), hydrophobically modified methylhydroxypropyl cellulose (HMMHPC), hydrophobically modified methylhydroxyethyl cellulose (HMMHEC), hydrophobically modified carboxymethylmethyl cellulose (HMCMMC), cationic hydroxyethyl cellulose (cationic HEC) and cationic hydrophobically modified hydroxyethyl cellulose (cationic HMHEC). In one non-limiting embodiment, the cellulose ether is HEC.

The cellulose ether powder is treated with small amounts of a cross-linker. The cross-linking can be carried out under conditions such that only a slight amount of formation of cross-linkages takes place, according to the method set forth in U.S. Pat. No. 2,879,268, the disclosure of which is incorporated herein by reference in its entirety. The concentration of the cross-linker in the cellulose ether powder is up to about 8% by weight, preferably between about 0.01 to 5% by weight.

The cross-linker is a multifunctional molecule having at least first and second reactive moieties. At least one of the reactive moieties is an aldehyde which can react with the pendent hydroxyl group of the cellulose ether to form a hemiacetal bond. The second reactive moiety can be a wide variety of different groups that will react with the cellulose ether, preferably the pendent hydroxyl group of the cellulose ether. These reactive groups include carboxyls, silanols, isocyanates, halomethyl, alkyl tosylate ether, and epoxide. The cross-linker may be a dialdehyde such as glyoxal. Glyoxalated cellulose ethers are commercially available.

The powdered acid for use in the present invention can be a water soluble powdered acid which can effectively lower the pH of water contacting the cellulose ether during dispersion to reduce the rate of hydrolysis of the hemiacetal bond between the cross-linker and the cellulose ether. This allows the cellulose ether to disperse in water before the particles of cellulose ether absorb too much water, creating lumps. Further, the acid must not be so reactive that it reduces the solubility stability of the cellulose ether during storage conditions by reacting with the cellulose ether causing the formation of water insoluble cellulose ether. "Solubility stable" is defined as the ability of cellulose ether to remain soluble upon accelerated aging where the cellulose ether is subjected, in a sealed system, to 60° C. exposure for at least 3 days, generally for at least 10 days or more, preferably 14 days or more.

The powdered acid can be one that provides storage stability of the cross-linked cellulose ether. Generally, such acids can be weak acids having a pKa of greater than 2 and less than 7.5. "pKa" is defined as the negative of the logarithm of the acid group dissociation constant Ka, measured under dilute aqueous solution and 25° C. conditions. Acids with higher pKas do not sufficiently protect the cross-linked cellulose ethers from hydrolysis. Certain water soluble polymeric acids useful in the present invention can include, but are not limited to, water soluble polyacrylic acid, water soluble polymethacrylic acid, polymaleic acid, water soluble acids formed from monomers reacted with acrylic acid, methacrylic acid or maleic acid, as well as polyvinyl sulfonic acid, polyastartic and copolymers of the above monomers (for example, Gantrez® polymers, available from Ashland Inc.). Other acids such as monosodium phosphate, trisodium pyrophosphate, and certain amino acids such as alanine, can also be used alone or in combination with other acids.

One class of weak acids suitable for use in the present invention is partially neutralized polycarboxylic acids. Partially neutralized polycarboxylic acid is defined as having at least one carboxylic acid group which has been neutralized and at least one carboxylic acid group which has not been neutralized. Neutralization herein is directed to a process wherein carboxylic moieties of the solid polycarboxylic acid are neutralized by means of a counter ion. Examples of such counter ions are $Na^+$, $K^+$, $NH^{4+}$ and the like.

The partially neutralized solid polycarboxylic acid powder may be a partially neutralized tricarboxylic acid where the tricarboxylic is, for example, but not by way of limitation, citric acid or a partially neutralized alpha hydroxycarboxylic acid where the alpha hydroxycarboxylic is, for example, but not by way of limitation, tartaric acid. The solid polycarboxylic acid powder used to produce the partially neutralized polycarboxylic acid powder may be selected from the group consisting of adipic acid, aldaric acid, citric acid, isocitric acid, tartaric acid, oxalic acid, malonic acid, maleic acid, itaconic acid, succinic acid, glutaric acid, pimelic acid, suberic acid, azelaic acid, sebacic acid, phthalic acid, aconitic acid, propane-1,2,3 tricarboxylic acid, and trimesic acid. Further, the polymeric acids (PAA and PMA) may also be partially neutralized.

As previously indicated, generally these acids can have a pKa of about 2 to about 7.5, more likely 3 to about 7, and many particularly suitable acids have a pKa of 4.2 to 6. One particularly suitable acid for use in the present invention is partially neutralized citric acid such as sodium monocitrate.

The method of forming cross-linked cellulose ether with a powdered acid for use in the present invention is not limited to a particular method. For example, the dry powdered acid can simply be combined together with the cross-linked cellulose ether. Preferably, the acid can have a relatively small particle size to allow it to be evenly distributed throughout the cellulose ether. Generally an average particle size of less than 100 microns and preferably less than 50 microns is suitable for use in the present invention. The powdered acid can be combined with the cellulose ether by other methods such as spray drying and, further, can be added at any suitable processing step during the formation of the cellulose ether, as well as cross-linking the cellulose ether. Acids soluble in organic solvents such as PAA can be dissolved in an organic solvent and added to the cellulose ether powder. The solvent is then evaporated. Thus, the present invention should not be limited to any particular method of making this powder blend.

The powder blend of the present invention can be used in any manner that water-soluble cellulose ether is used. Generally, it can be added directly to a water-based system under agitation. This allows the cellulose ether to be dispersed throughout the water and then subsequently dissolved in the water to provide a lump-free water-based system. Further, the powder blend can be added at any suitable step during the formation of the water-based system. For example, it can be added as a dry powder to the grind of a paint formulation and subsequently combined with water. Some or all components of a water-based system can be coated onto the cellulose ether powder by using any typical powder processing method if desired. The cellulose ether powder of the present invention is particularly suited for addition to water-based systems that have a viscosity greater than the viscosity of water, such as a paint formulation, other emulsions used in food preparation, personal care products and others.

The powder blend of the present invention can also used in a powder handling and mixing device for dispersing the water soluble cellulose ether with improved dispersing properties. A method for dispersing a dry cellulose ether formulation using the powder handling and mixing device comprises the steps of: feeding the dry cellulose ether formulation to a feeder at an adjustable rate, wetting the dry cellulose ether formulation with a hydration agent, mixing the wetted cellulose ether formulation with additional hydration agent in a mixer, and forming a uniform and clear solution. The dry cellulose ether formulation comprises (i) a cellulose ether cross-linked with a cross-linker having a first reactive moiety and a second reactive moiety, the first reactive moiety being an aldehyde; and (ii) a solid water soluble acid. The dry cellulose ether formulation is the same as those described previously. In one non-limiting embodiment, the hydration agent is water. In another non-limiting embodiment, the hydration agent is an aqueous solution.

Figure 8A:
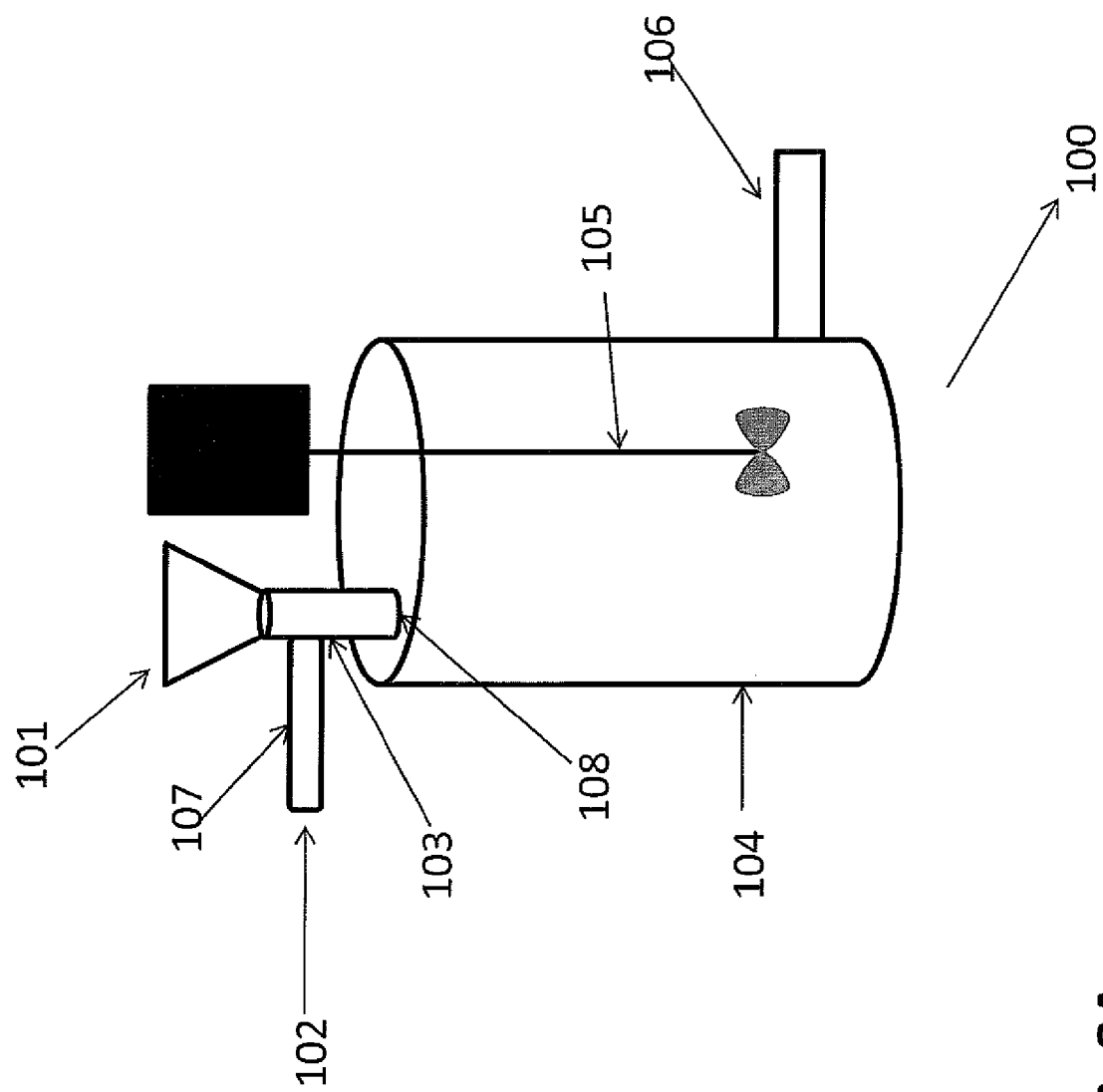
FIGS. 8A-8C are schematic diagrams of alternative embodiments of an eductor-mixer system that can be used for dispersing a dry cellulose ether powder according to the present invention.

Referring now to FIG. 8A, shown therein is one exemplary embodiment of a powder handling and mixing device 100, in which the method for dispersing a dry cellulose ether formulation can be conducted. The device 100 comprises a powder feeder 101 to hold a dry cellulose ether formulation powder, a water inlet 102, an eductor-mixer system 103, a mixing tank 104, a mixing stirrer 105, a slurry outlet 106, a Venturi tube 107, and a discharge outlet 108.

The powder feeder 101 is connected to the eductor-mixer system 103 which is connected to the water inlet 102. The educator-mixer system 103 is connected to the mixing tank 104 through the discharge outlet 108. The mixing stirrer 105 is located inside the mixing tank 104. The slurry outlet 106 is located in the bottom of the mixing tank 104.

The powder feeder 101 can be a loss-in-weight feeder, a vacuum pick-up unit, a skid mounted wetting system, and the like. The skid may contain the controls and equipment needed to wet the cellulose ether formulation that is being weighed by the feeder. The loss-in-weight feeder can be an Acrison 270 "In-Line" Weigh Feeder, available from Acrison Inc., Monnachie, N.J. The vacuum pick-up unit is available from Semi-Bulk System Inc, St. Louis, Mo. 103

The dry cellulose ether formulation comprising a cross-linked cellulose ether and a solid water soluble acid can be fed through the powder feeder 101 into the eductor-mixer system 103. In one non-limiting embodiment, the cross-linked cellulose ether and the solid water soluble acid can be premixed to form a mixture. The mixture can then be fed into the powder feeder 101. In another non-limiting embodiment, the cross-linked cellulose ether and the solid water soluble acid can be fed through its own powder feeder located above the powder feeder 101 (not shown in FIG. 8A) and then can be mixed together in the powder feeder 101.

The step of the wetting can be carried out in the eductor-mixer system 103. The eductor-mixer system 103 can be designed to continuously mix a solute such as dry polymer powders, paint pigments, fire retardants, liquids and gels, (e.g., a powder, particulate, or other pressure transportable or fluidizable material, a liquid or a gas) and a solvent or working fluid (e.g., a liquid or in some instances a gas) to form a dispersion, slurry, or solution. The use of eductor-mixer system for mixing chemical concentrates into a stream of liquid to provide a diluted solution is well known. For example, see U.S. Pat. Nos. 5,927,338 and 6,279,598 issued to S.C. Johnson Commercial Markets, Inc., and U.S. Pat. No. 8,336,569 issued to Diversery, Inc., which teachings are incorporated herein by reference.

An educator pump (not shown in FIG. 8A) is connected to the water inlet 102 is activated. Water is pumped through the Venturi tube 107 into the mixing tank 104 through the discharge outlet 108 inside the mixing tank 104. The water flows through the Venturi tube 107 creates a vacuum in the eductor-mixer system 103. Water can be returned to the mixing tank 104 and recirculated. The polymer powder flows from the powder feeder 101 under the vacuum and is wetted in the eductor-mixer system 103. Extreme turbulence caused by high water velocity in the eductor-mixer system 103 can assure intimate contact between the water and the polymer powder. The polymer swells immediately and is in a well dispersed by the time the mixture is discharged from the eductor-mixer system 103.

Existing state-of-the-art eductor-mixer systems typically include a conical, converging stream of working fluid, as most solutes used with these systems require a relatively large diameter solute tube and conveying line (more than 1.0-1.5 inches) to be transported vacuum pneumatically without clumping or clogging. With such large diameter delivery tubes, a conical nozzle is required to deflect the working fluid stream into a discharge tube small enough in diameter to meet the cross-sectional area criterion for vacuum generation and mixing. Although some solute materials may be vacuum transported in smaller diameter tubes, these smaller diameter solute tubes suffer from accretion of the solute material at the discharge outlet due to small amounts of the working fluid splashing back into the solute tube from turbulence formed at the conical deflector in the discharge tube.

The eductor-mixer system 103 can be equipped with air bleed holes (not shown in FIG. 8A). The holes permit air to be drawn into the dry powder stream, adding in proper powder dispersion in the water stream. Also, closing one hole can increase the suction on the powder feed and increase the feed rate. In one non-limiting embodiment, the eductor-mixer system 103 can have one or more air bleed holes open.

The water velocity (flow rate) through the eductor-mixer system 103 should always be high enough to assure a high degree of turbulence and a positive downward flow without splashing up into the upper section of the eductor-mixer system 103, which should be dry at all the times. The water flow rate through the eductor-mixer 103 can be controlled by a combination of adequate line pressure and suitable annulus size. The water flow rate can be controlled and measured with a computer controlled in-line flow meter installed. In one non-limiting embodiment, the water flow can be in a range of from about 7 gallon/min to about 30 gallon/min. The polymer powder feed rate can be in a range of from about 4 pound/min to about 30 pound/min. In another non-limiting embodiment, the water flow rate can be in a range of from about 7 gallon/min to about 20 gallon min. The polymer powder feed rate can be in a range of from about 10 pound/min to about 50 pound/min.

The wetted polymer powder (slurry) is discharged into the mixing tank 104 through the discharge outlet 108. The mixing tank 104 contains extra water before the slurry is discharged into it. In one non-limiting embodiment, the discharge outlet 108 can be placed at least one foot inside the edge of the mixing tank 104 to prevent buildup of solids at the discharge. The mixing stirrer 105 is agitated to ensure good mixing between the slurry and the water in the mixing tank 104.

The mixing can be conducted in any manner known in the art. The stirrer can comprise a rotating impeller, a stator/rotor, or any combinations thereof. In one non-limiting embodiment, the mixing can be conducted using a low shear mixing stirrer. In another non-limiting embodiment, the mixing can be conducted using a high shear mixing stirrer. A uniform and clear solution can be formed after mixing in the mixing tank 104 or by pumping the slurry to a additional mixing tank which may contain additional ingredients (example pumping slurry from the mixing tank to a tank containing paint)

Alternatively, dispersing a dry cellulose ether formulation can be conducted in a Venturi mixer system. Examples of the Venturi mixer systems can include, but are not limited to, Vacucam® Ejector Mixer and Vacucam® EJM 2000, available from SemiBulk Systems Inc., St. Louis, Mo., which uses the vacuum created in the Venturi mixer to completely wet the dry powder. The water pressure is maintained in the Venturi mixer using a gear pump.

A method for dispersing a dry cellulose ether formulation comprises the steps of feeding a dry cellulose ether formulation powder at an adjustable rate to a Venturi mixer system, wetting the dry cellulose ether formulation with water in the Venturi mixer system to form a cellulose ether slurry at a concentration of from about 2% to about 40% based on the weight of the cellulose ether, delivering the cellulose ether slurry to a gauging water to form a cellulose ether pre-dispersion in the gauging water, calculating a cellulose pre-dispersion delivery rate by means of a slurry output controller, and delivering the cellulose ether pre-dispersion in the gauging water to a board mixer.

The dry cellulose ether formulation powder can be conveyed into the Venturi mixer by a near-perfect vacuum, which can be created when pressurized water is discharged at a high-velocity, hollow jet into which the powder is drawn. The Venturi mixer system can achieve high-speed, instantaneous and complete wetting by bringing together the powder stream and water stream. The reactive surface of the powder and water can be maximized before intimate contact is actually made, resulting uniform and superior wetting.

In one non-limiting embodiment, the wetted cellulose ether formulation is ejected into a holding tank that deaerates the cellulose ether formulation slurry and provides time for the cellulose ether formulation to start swelling and dissolving in the hydration agent. From this tank, the cellulose ether formulation slurry is metered back into the gauging water line to be dispersed into the gauging water before the board mixer.

The present invention also relates to a method for dispersing a dry cellulose ether powder. The method comprises the steps of: feeding the dry cellulose ether powder to a feeder at an adjustable rate, wetting the dry cellulose ether with a hydration agent and an acid solution, mixing the wetted cellulose ether with additional hydration agent in a mixer, and forming a uniform and clear solution. In one non-limiting embodiment, the hydration agent is water.

The acid solution comprises an acid in a liquid or solid form. If an acid is solid, the acid solution can be formed by dissolving the solid acid into water. The acid can be an organic acid or an inorganic acid. The organic acid can be a carboxylic acid, functionalized carboxylic acid, or polycarboxylic acid. The carboxylic acid can be selected from citric acid, tartaric acid, lactic acid, acetic acid, oxalic acid, malonic acid, succinic acid, polyacrylic acid and the like. Examples of the inorganic acids can include, but are not limited to, phosphoric acid, sulfuric acid, boric acid, and nitric acid.

The solid acid can be a powder solid described previously including water soluble polymeric acids, partially neutralized polycarboxylic acids, and other acids such as monosodium phosphate, trisodium pyrophosphate, and certain amino acids such as alanine, can also be used alone or in combination with other acids.

Figure 8B:
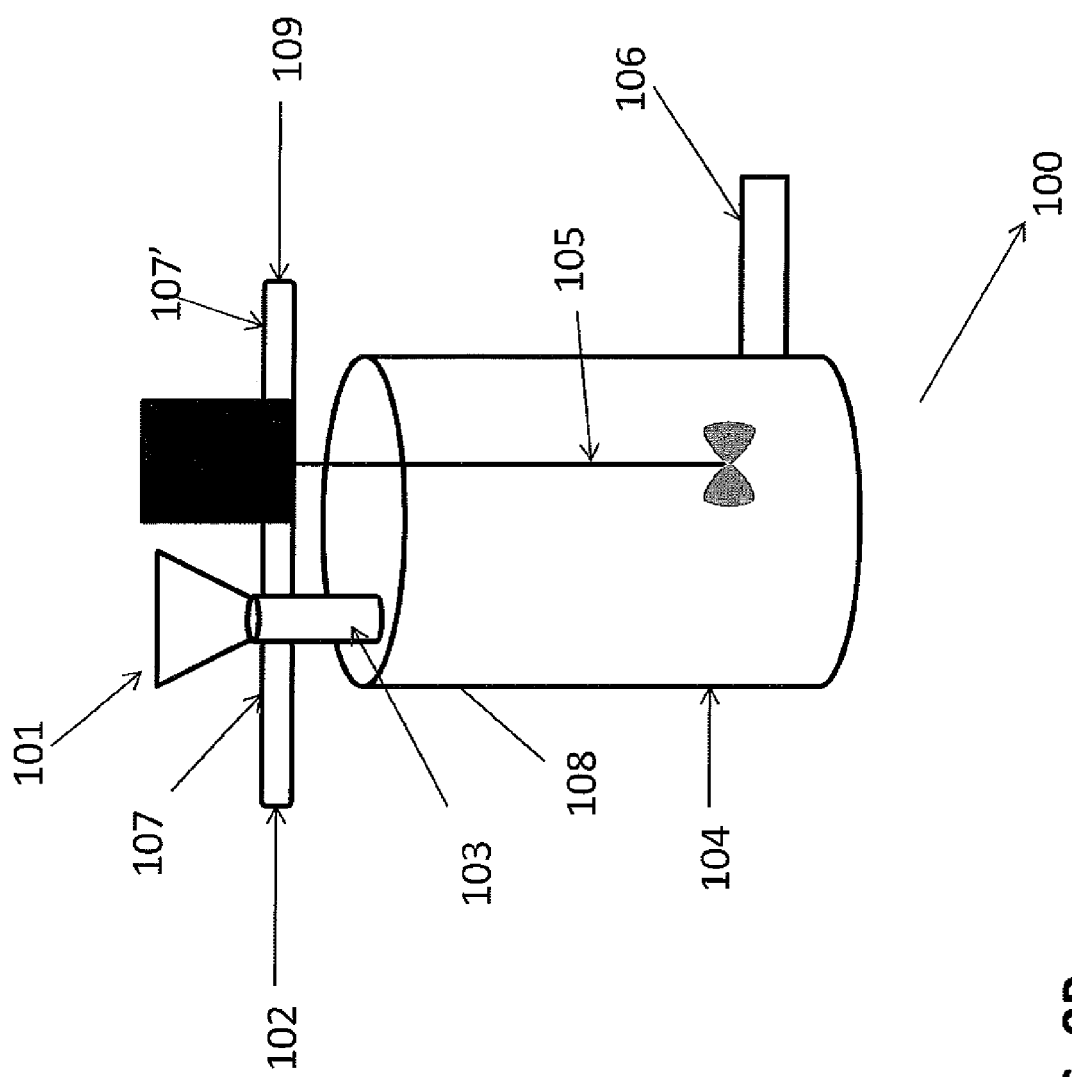
Figure 8C:
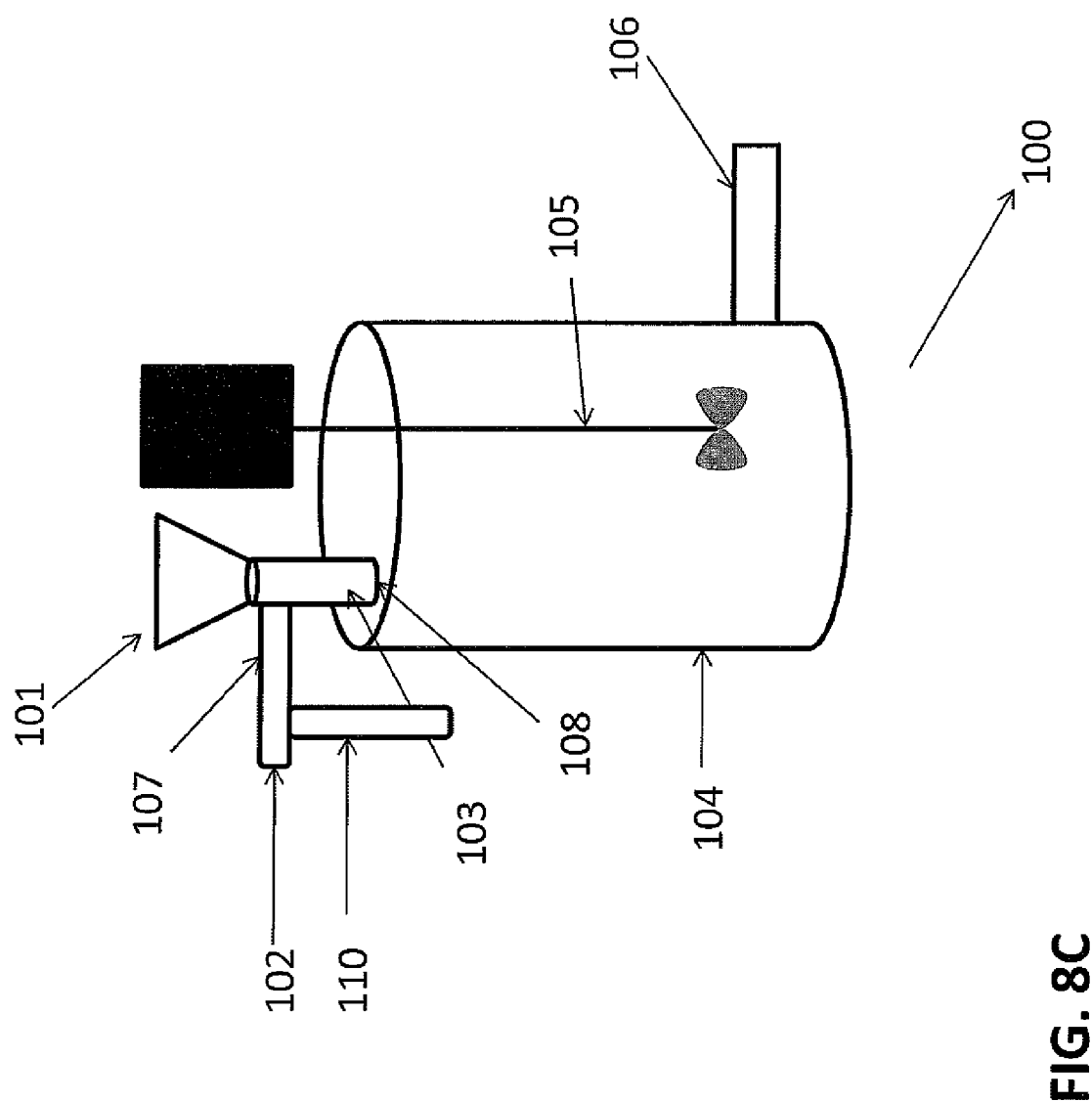

FIG. 8B depicts one exemplary embodiment of a powder handling and mixing device 100 for dispersing a dry cellulose ether powder. The device is the same as those shown in FIG. 8A except that an acid stream inlet 109 and a Venturi tube 107' are added. The acid stream inlet 109 is connected to the eductor-mixer system 103. FIG. 8C depicts another exemplary of a powder handling and mixing device 100 for dispersing a dry cellulose ether power. In this embodiment, an acid stream inlet 110 is added and perpendicularly connected to the water inlet 102 based on the device shown in FIG. 8A.

An acid pump (not shown in FIG. 8B or FIG. 8C) is connected to the acid stream inlet 109 in FIG. 8B and the acid stream inlet 110 in FIG. 8C. Referring to FIG. 8B, water and the acid solution are pumped simultaneously through the Venturi tubes 107 and 107' into the mixing tank 104. Both water and acid solution flow through the Venturi tubes 107 and 107', and create a vacuum in the eductor-mixer system 103. The dry cellulose ether powder flows from the powder feeder 101 and is wetted simultaneously by the water and the acid solution.

Referring to FIG. 8C, the acid solution is pumped to the water inlet 102 and mixed with the water to form a mixture before flows through the Venturi tube 107. Then the mixture flows through the Venturi tube 107 and wets the dry cellulose ether powder in the eductor-mixer system 103.

The wetted polymer powder (slurry) is discharged into the mixing tank 104 through the discharge outlet 108. The step of the mixing is the same as those described previously.

Alternatively, dispersing a dry cellulose ether powder can also be conducted in a Venturi mixer system. A method for dispersing a dry cellulose ether powder comprises the steps of: feeding a dry cellulose ether powder and an acid solution at an adjustable rate to a Venturi mixer system, wetting the dry cellulose ether with water and an acid solution in the Venturi mixer system to form a cellulose ether slurry at a concentration of from about 2% to about 40% based on the weight of the cellulose ether, delivering the cellulose ether slurry to a gauging water to form a cellulose ether pre-dispersion in the gauging water, calculating a cellulose pre-dispersion delivery rate by means of a slurry output controller, and delivering the cellulose ether pre-dispersion in the gauging water to a board mixer.

The following examples illustrate the presently disclosed and claimed inventive concept(s), parts and percentages being by weight, unless otherwise indicated. Each example is provided by way of explanation of the presently disclosed and claimed inventive concept(s), not limitation of the presently disclosed and claimed inventive concept(s). In fact, it will be apparent to those skilled in the art that various modifications and variations can be made in the presently disclosed and claimed inventive concept(s) without departing from the scope or spirit of the invention. For instance, features illustrated or described as part of one embodiment, can be used on another embodiment to yield a still further embodiment. Thus, it is intended that the presently disclosed and claimed inventive concept(s) covers such modifications and variations as come within the scope of the appended claims and their equivalents.

EXAMPLES

The examples presented herein were generated on 300 g scale using water-based solutions such as architectural paint formulation, polymer solutions, or buffered water solutions. The extent of cellulose ether dissolution was deduced from torque values generated by Haake VT550 viscometer that provides mixing while acquiring torque readings.

Figures shown herein illustrate the benefit of the claimed invention and show the changes in torque with time as the water soluble polymer dissolves. The conventional addition protocol involved pre-slurring the water soluble polymer in water prior to addition to the water-based solution is presented. As a negative control, i.e. the dissolution of directly added water soluble polymer without the partially neutralized solid carboxylic acid is presented. Finally, the water soluble polymer powder blend of the invention is presented.

Figure 2:
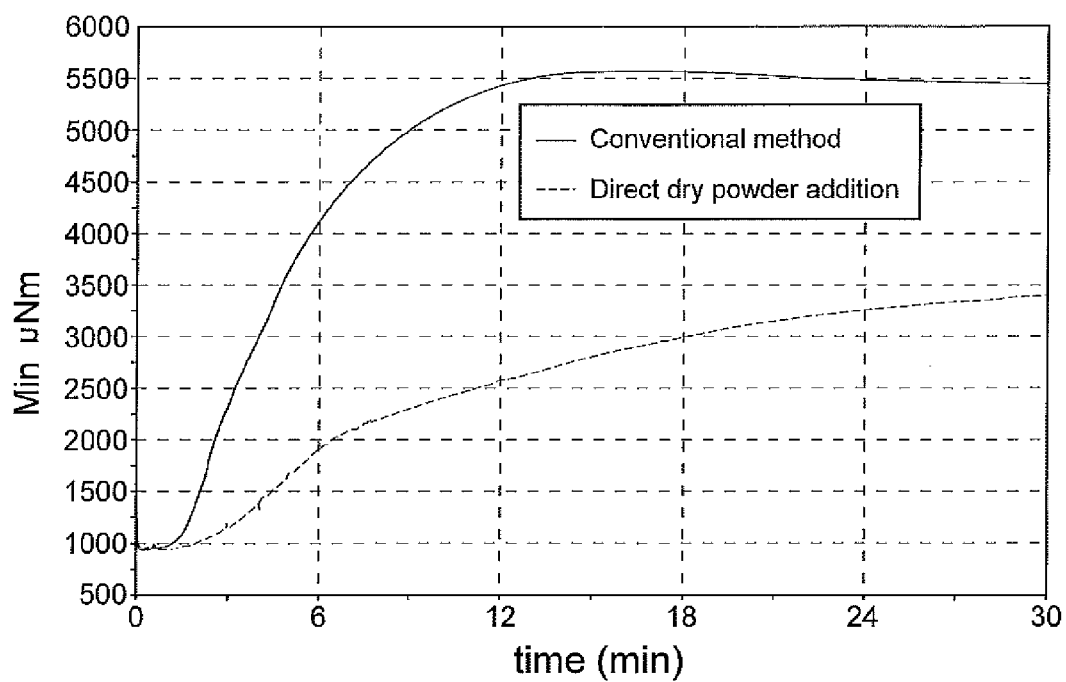
FIG. 2 is a graph which illustrates dissolution over time of glyoxalated HEC added to un-thickened paint (i.e. no rheology modifier added) by conventional method or directly adding the HEC as a dry powder.
Figure 3:
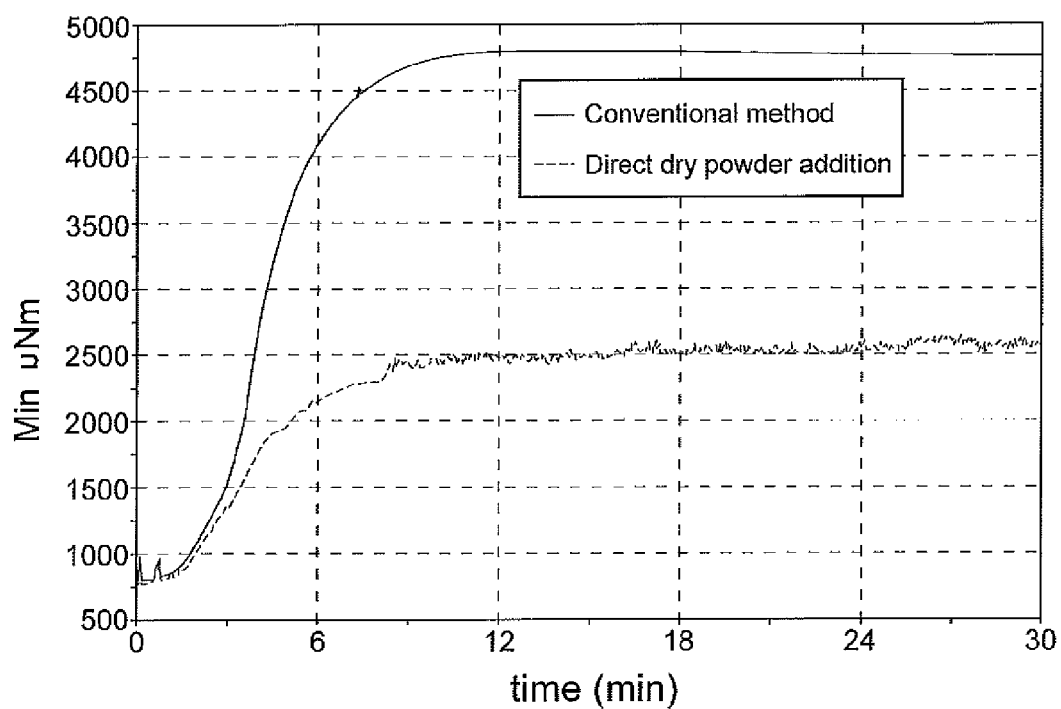
FIG. 3 is a graph which illustrates dissolution over time of glyoxalated HEC added to pH 8.5 buffered solutions containing pre-dissolved 0.3 wt % of the said polymer by conventional method or directly adding the HEC as a dry powder.

FIGS. 1 through 3 illustrate comparative examples where the technical challenge of dissolving a water-soluble polymer in water is demonstrated. FIG. 1 illustrates that glyoxalated HEC, (Natrosol® 250HXR hydroxyethyl cellulose, available from Hercules Incorporated) dissolved lump free in buffered water at pH 8.5 (100 mM Tris buffer) regardless of how it was added, i.e. directly as a dry powder or conventionally by pre-slurring. FIGS. 2 and 3 illustrate that the same does not hold true when the glyoxalated HEC was added to a more viscous water-based systems such as an un-thickened architectural paint, pH 8.5 (FIG. 2) or 0.3 wt % HEC solution in pH 8.5 Tris buffer (FIG. 3). The poor dissolution of directly added HEC was manifested by lower torque values and was caused by the polymer lumping. This illustrated lumping phenomenon is not limited to paints or polymer solutions but rather can be generalized to water-based systems with viscosity exceeding the viscosity of water and having pH above 7.

Figure 4:
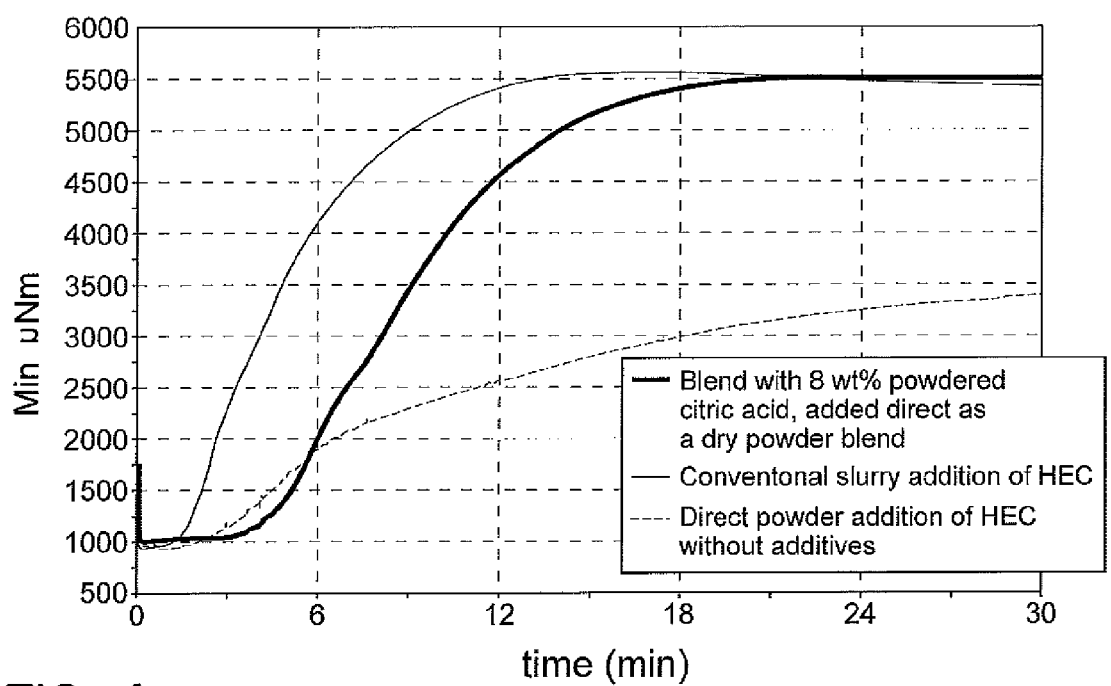
FIG. 4 is a graph which illustrates dissolution over time of glyoxalated HEC in un-thickened paint, a glyoxalated HEC blend with 8 wt % powdered citric acid, added direct as a dry powder blend, a conventional slurry addition of HEC (as is), or a direct powder addition of HEC without additives.

FIG. 4 illustrates a comparative example having an improved performance of a glyoxalated HEC blend with 8 wt % (based on the total weight) of powdered citric acid. The blended material readily dissolved in paint formulation without lumps.

Figure 5:
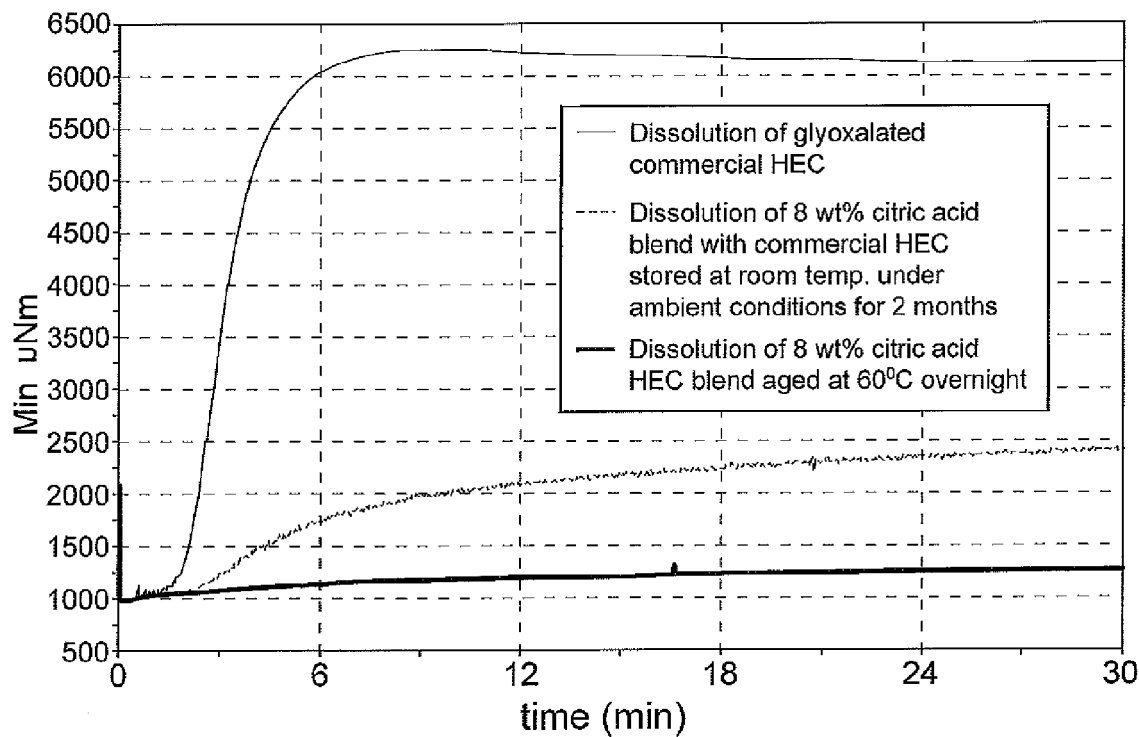
FIG. 5 is a graph which illustrates the shelf stability of glyoxalated HEC blends with citric acid where dissolution over time of the blend when initially produced, when stored at ambient conditions for 2 months; and when aged overnight at 60° C. is shown.

The powder blend of glyoxalated HEC with citric acid, however, was found to have unacceptable solubility stability. The instability manifested in a worsening of HEC dissolution as illustrated in FIG. 5. The dissolution of HEC powder without aging, the blend stored at room temperature for 2 months and the blend aged overnight at 60° C. are found in FIG. 5. The worsening of dissolution with aging was evident and, while not wishing to be bound by theory, was attributed to cross-linking esterification reaction between HEC and the carboxylic groups of the citric acid.

Example 1

A dry blend was prepared using hydroxyethyl cellulose (Natrosol® 250HXR hydroxyethyl cellulose available from Ashland Inc.) and 8 wt % of powdered monosodium citrate (on the total weight basis). The blend was aged in 60° C. oven over 10 days. The subsequent dissolution of the said blend in 100 mM Tris buffer solution at pH 8.5 exhibited dissolution similar to the dissolution of commercial Natrosol® 250HXR.

Figure 6:
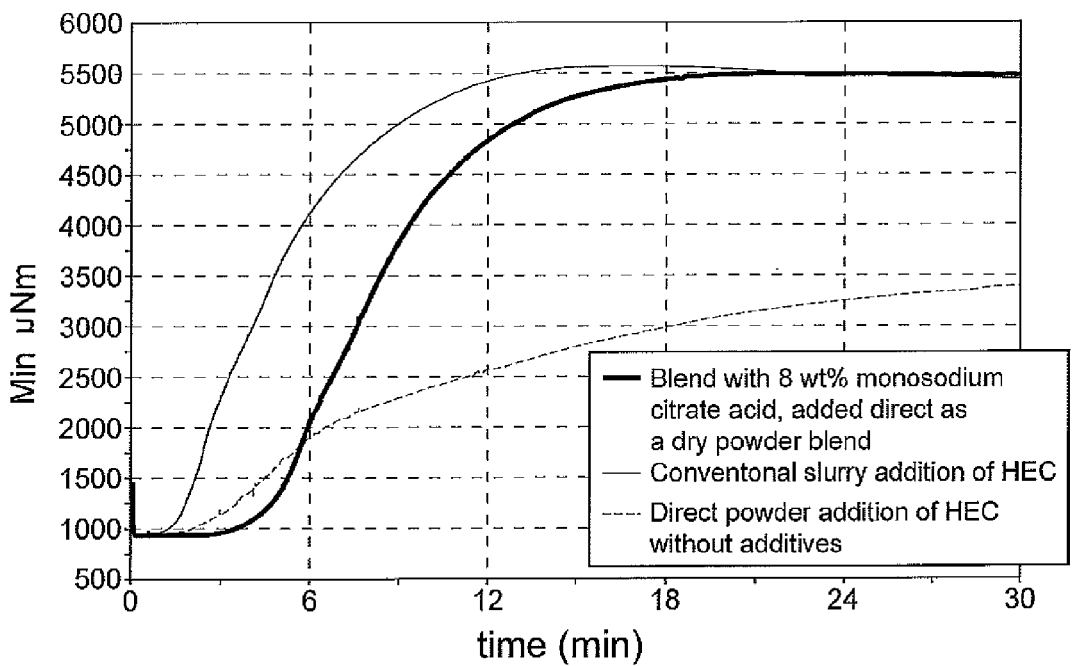
FIG. 6 is a graph which illustrated the dissolution over time of glyoxalated HEC in un-thickened paint when blended with 8 wt % monosodium citrate when added directly as a dry powder blend, as a conventional slurry addition of HEC (as is), or as a direct powder addition of HEC without the 8 wt % monosodium citrate.

Surprisingly, it was found that blending glyoxalated HEC with a partially neutralized powdered carboxylic acid delivered the desired benefit of lump free dissolution with good solubility stability, as defined by the viscosity of the glyoxalated HEC being substantially unaffected by aging when compared to samples of the glyoxalated HEC with powdered citric acid. FIG. 6 illustrates the performance of the blend of the present invention and illustrates that the blend delivers lump free dissolution.

Example 2

A dry blend was prepared using hydroxyethyl cellulose (Natrosol® 250HXR hydroxyethyl cellulose available from Ashland Inc.) and 6 wt % of monosodium citrate powder having an average particle size of 50 µm. The blend was added as a dry powder to a water-based paint formulation, pH 8.5, described in Table 1 in the amount corresponding to 0.48 wt % of the total paint weight basis. The dissolution was carried out in 8 oz jar using 1½" diameter marine propeller type blade at 300 RPM. The dry blend readily dissolved bringing the paint viscosity to 97 KU.

TABLE 1

Paint formulation

| Pigment Grind | Wt. % |
|---|---|
| Base Paint | |
| Distilled Water | 28.1 |
| Nuosept 95 | 0.3 |
| Tamol 731A | 0.7 |
| Igepal CO-660 | 0.3 |
| Igepal CO-897 | 0.4 |
| AMP-95 | 0.2 |
| Propylene Glycol | 2.0 |
| Rhodeline 640 | 0.2 |
| Water, Discretionary | 15.7 |
| Ti-Pure R-931 TiO2 | 3.2 |
| ASP NC Clay | 12.2 |
| #10 White Calcium Carbonate | 8.7 |
| Celite 281 | 1.7 |
| Disperse To Hegman 4 to 5- | |
| Add all discretionary water- | |
| Letdown | |
| Ucar Latex 379G | 23.2 |
| Texanol | 1.3 |
| Rhodeline 640 | 0.3 |
| Propylene Glycol | 1.5 |
| Thickened Paints (grams) | |
| Base Paint | 220.0 |
| Thickener | 50.0 |
| Water | |
| Total | 270.0 |

Example 3

A dry blend was prepared using hydroxyethyl cellulose (Natrosol® 250HBR hydroxyethyl cellulose available from Ashland Inc.) and 10 wt % of monosodium citrate powder having an average particle size of 50 µm. The blend was added as a dry powder to 0.3 wt % hydroxyethyl cellulose solution (Natrosol® 250HXR hydroxyethyl cellulose available from Ashland Inc.) prepared in 100 mM Tris buffer at pH 8.5. The blend was added directly as a dry powder under the mixing conditions described in Example 2. The addition of the blend produced readily soluble, lump-free solution.

Example 4

A hydroxyethyl cellulose (Natrosol® 250HXR hydroxyethyl cellulose available from Ashland Inc.) was dry blended with 8 wt % of monosodium citrate with particle size of 50 µm. A commercial paint formulation with a viscosity of 110 KU and pH 9.7 was obtained. The paint formulation was diluted 10 wt % with water that lowered paint viscosity to 100 KU. The blend in the amount of 0.075 wt % of the total paint mass of 2,350 grams was added to the diluted paint to simulate viscosity post adjustment in paint manufacturing process. The blend was added directly onto the surface of the mixing paint as a dry powder. The mixing was carried out in 2 L glass jar, using an overhead stirrer consisting of two pitch turbine blades, each at 7.6 cm in diameter, rotated at 300 RPM. The added dry blend fully dissolved without lumps and brought paint viscosity to 107 KU.

Example 5

Figure 7:
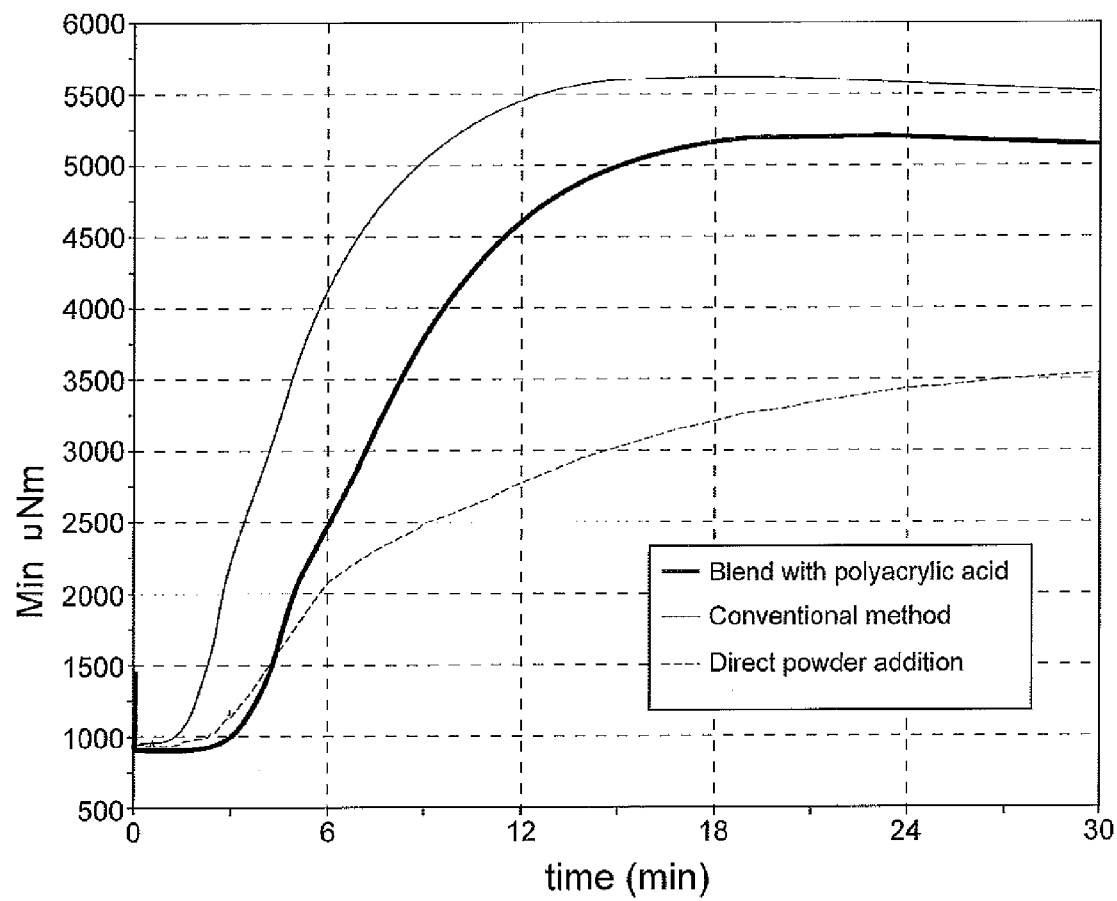
FIG. 7 is a graph illustrating commercial HEC added as a slurry and dry compound compared to the present invention utilizing polyarylic acid.

A hydroxyethyl cellulose (Natrosol® 250HXR) was treated with polyacrylic acid, MW 1800. The following procedure was employed. Polyacrylic acid was first solubilized in acetone to produce 5 wt % solution. The solution was them mixed with hydroxyethyl cellulose, then dried in a fluid bed dryer. The resulting powder was added dry to un-thickened 70PVC paint (Table 1) and polymer dissolution followed using Haake viscometer at 300 RPM. As shown in FIG. 7, the composition readily dissolved lump-free. For comparison, FIG. 7 contains the dissolution profiles of commercial hydroxyethyl cellulose added as a slurry and dry, with the latter extensively lumping.

Example 6

Hydroxyethyl cellulose (Natrosol® 250H4BR, available from Ashland Inc.) was treated with 0.5 wt % of glyoxal and powdered monosodium citrate (MSC) with HEC:MSC weight ratio 97:3. A blend was made by mixing all the above ingredients in a Harbil® shaker for about 6 minutes.

Example 7

0.5 grams of Natrosol™ 250H4BR (hydroxyethyl cellulose, HEC) was placed in an 8 oz jar. A pH 7.5 buffer at about 30° C. was added by dropwise into the jar for about 5 minutes and mixed with the HEC using a spatula until a slurry was formed. The slurry concentration was about 5 wt % and stored for about 10 minutes. No aggregation was observed. Then 89 grams of pH 7.5 buffer were added into the slurry. All the ingredients were mixed at 260 rpm for about 30 minutes using a 35 mm diameter anchor type blade. The particles in the slurry were re-dispersed immediately to form a clear solution once the extra buffer was added. No visible lumps were observed in the solution and the HEC was completely dissolved upon mixing.

Example 8

2.5 grams of Natrosol™ 250H4BR was placed in an 8 oz jar. A pH 7.5 buffer at 30° C. was added by dropwise into the jar for about 5 minutes and mixed with the hydroxyethyl cellulose with a spatula until a slurry was formed. The slurry concentration was 25 wt % and stored for about 10 minutes. The slurry showed aggregation and did not have a uniform appearance. Then 89 grams of pH 7.5 buffer were added into the slurry. All the ingredients were mixed at about 260 rpm for about 30 minutes using a 35 mm diameter anchor type blade. The particles in the slurry were not re-dispersed. There were visible lumps present which did not dissipate on mixing.

Example 9

The blend of powder formulation in Example 6 was subjected to the same test as described in Example 8. 2.5 grams of the powder formulation was placed in an 8 oz jar. A pH 7.5 buffer at 30° C. was added by dropwise into the jar for about 5 minutes and mixed with the powder formulation with a spatula until slurry was formed. The slurry concentration was 25 wt % and stored for about 10 minutes. The slurry did not show any aggregation and had a uniform consistency. Then 89 grams of pH 7.5 buffer were added into the slurry. All the ingredients were mixed at 260 rpm for 30 minutes using a 35 mm diameter anchor type blade. The particles in the slurry were re-dispersed immediately and formed a clear solution. There were no lumps present.

Example 10

2.5 grams of the blend of powder formulation in Example 6 was placed in an 8 oz jar. A pH 8.5 buffer at 30° C. was added by dropwise into the jar for about 5 minutes and mixed with the powder formulation with a spatula until the slurry was formed. The slurry concentration was 25 wt % and stored for 10 minutes. The slurry did not show any aggregation and had a uniform appearance. Then 89 grams of pH 8.5 buffer were added. All the ingredients were mixed at 260 rpm for about 30 minutes using a 35 mm diameter anchor type blade. The particles of the slurry were re-dispersed immediately and formed a clear solution. There were no lumps upon mixing the powder was completely dissolved.

Example 11

An educator system shown in FIG. 8A is used for dispersing hydroxyethyl cellulose. Natrosol™ 250H4BR (5 wt %) is added through the powder feeder into the eductor-mixer system which is connected to the water inlet. Water is fed through the water inlet. The HEC is wetted and mixed in the eductor-mixer system. The HEC is then re-dispersed in the mixing tank to form a clear solution. No lumps are observed.

Example 12

An educator system shown in FIG. 8A is used for dispersing hydroxyethyl cellulose. Natrosol™ 250H4BR (25 wt %) is added through the powder feeder into the eductor-mixer system which is connected to the water inlet. Water is fed through the water inlet. The relative rates of HEC and water result in an instantaneous concentration of 25 wt %. The HEC is wetted and mixed in the eductor-mixer system. Due to the high concentration of HEC, the particles are not wetted properly. The wetted HEC is then re-dispersed in the mixing tank to form a slurry with lumps.

Example 13

The blend of powder formulation in Example 6 is added to the powder feeder into the eductor-mixer system shown in FIG. 8A and water is fed through the water inlet. The relative rates result in an instantaneous concentration of 25 wt %. The blend is wetted and mixed in the eductor-mixer system and then gets re-dispersed in the mixing tank to form a uniform and lump free solution.

Example 14

Natrosol 250H4BR powder is added to the powder feeder into the eductor-mixer system shown in FIG. 8B. Water is fed through the water inlet. Simultaneously, 10% solution of citric acid with a pH of ~3.8 is fed through the acid stream inlet. The relative rates of water; citric acid and HEC feed result in a slurry of instantaneous concentration of 25 wt % of HEC. The slurry is re-dispersed in the mixing tank to form a uniform and lump free solution.

Example 15

Hydroxyethyl cellulose (Natrosol® Plus 330, available from Ashland Inc.) was treated with 0.5 wt % of glyoxal and powdered monosodium citrate (MSC) with HEC:MSC weight ratio 92:8. The blend was made by mixing all the ingredients in a Harbil® shaker for about 6 minutes.

Example 16

A Vacucam™ Ejector system is used to make a slurry of Natrosol™PLUS 330. Natrosol™ PLUS 330 powder is added to a hopper funnel and conveyed to the Vacucam™ Ejector system at the rate of about 115 lbs/min. A metered water supply (pH ≈9.0) is also fed to the Vacucam™ Ejector system at the rate of about 655 lbs/min. The relative rates result in an instantaneous concentration of 15 wt % HEC. There is smooth flow and no line plugging. The slurry output of the Ejector system is fed into the mixing tank under mild agitation. The slurry is re-dispersed without any lumps and dissolved completely upon mixing Example 17

A Vacucam™ Ejector system is used to make a slurry of Natrosol™ PLUS 330. Natrosol™ PLUS 330 powder is added to the hopper funnel and conveyed to the Vacucam™ Ejector system at the rate of about 193 lbs/min. A metered in water supply pH (9.0) is also fed to the Vacucam™ Ejector system at the rate of about 655 lbs/min. The relative rates result in an instantaneous concentration of 25 wt % HEC. This high concentration also causes plugging of the lines of the system. The slurry output of the Ejector system is fed into the mixing tank under mild agitation. The slurry is re-disperses but forms lumps which do not dissipate upon mixing in few hours.

Example 18

A Vacucam™ Ejector system is used to make a slurry for the powder sample of Example 15. The powder is added to the hopper funnel and conveyed to the Vacucam™ Ejector system at the rate of about 193 lbs/min. A metered water supply pH (≈9.0) is also fed to the Vacucam™ Ejector system at the rate of about 655 lbs/min. The relative rates result in an instantaneous concentration of 25 wt % HEC. Even at the high concentration, there is smooth flow and no line plugging. The slurry output of the Ejector system is fed into the mixing tank under mild agitation. The slurry re-disperses without any lumps and dissolves completely upon mixing.

It is, of course, not possible to describe every conceivable combination of the components or methodologies for purpose of describing the disclosed information, but one of ordinary skill in the art can recognize that many further combinations and permutations of the disclosed information are possible. Accordingly, the disclosed information is intended to embrace all such alternations, modifications and variations that fall within the spirit and scope of the appended claims.

What is claimed is:

1. A method for dispersing a dry cellulose ether formulation in an aqueous solution without forming lumps, comprising the steps of:
    (a) feeding the dry cellulose ether formulation to a feeder at an adjustable rate;
    (b) wetting the dry cellulose ether formulation with a hydration agent;
    (c) mixing the wetted cellulose ether formulation with additional hydration agent in a mixer; and
    (d) forming a uniform and clear solution,
  wherein the dry cellulose ether formulation comprises (i) a cellulose ether cross-linked with a cross-linker having a first reactive moiety and a second reactive moiety, and (ii) a solid water soluble acid, wherein the solid water soluble acid is present in the dry cellulose ether formulation in an amount from about 0.1 to about 20% by weight of the dry cellulose ether formulation.

2. The method of claim 1, wherein the first reactive moiety is an aldehyde.

3. The method of claim 1, wherein the cellulose ether is selected from the group consisting of hydroxyethyl cellulose (HEC), hydroxypropyl cellulose (HPC), water soluble ethylhydroxyethyl cellulose (EHEC), carboxymethyl cellulose (CMC), carboxymethylhydroxyethyl cellulose (CMHEC), hydroxypropylhydroxyethyl cellulose (HPHEC), methylcellulose (MC), methylhydroxypropyl cellulose (MHPC), methylhydroxyethyl cellulose (MHEC), carboxymethylmethylcellulose (CMMC), hydrophobically modified carboxymethylcellulose (HMCMC), hydrophobically modifiedhydroxyethyl cellulose (HMHEC), hydrophobically modified hydroxypropyl cellulose (HMHPC), hydrophobically modified ethylhydroxyethyl cellulose (HMEHEC), hydrophobically modified carboxymethylhydroxyethyl cellulose (HMCMHEC), hydrophobically modified hydroxypropylhydroxy ethyl cellulose (HMHPHEC), hydrophobically modified methyl cellulose (HMMC), hydrophobically modified methylhydroxypropyl cellulose (HMMHPC), hydrophobically modified methylhydroxyethyl cellulose (HMMHEC), hydrophobically modified carboxymethylmethyl cellulose (HMCMMC), cationic hydroxyethyl cellulose (cationic HEC) and cationic hydrophobically modified hydroxyethyl cellulose (cationic HMHEC).

4. The method of claim 1, wherein the solid water soluble acid is a carboxylic acid selected from the group consisting of citric acid, tartaric acid, oxalic acid, malonic acid, polyacrylic acid, polymethacrylic acid, and combinations thereof.

5. The method of claim 1, wherein the solid water soluble acid has a pKa of from 2 to 7.5.

6. The method of claim 5, wherein the solid water soluble acid is selected from the group consisting of water soluble polymeric acids, sodium phosphate, trisodium pyrophosphate, amino acids, and combinations thereof.

7. The method of claim 1, wherein the second reactive moiety is selected from the group consisting of aldehyde, carboxyl, silanol, isocyanate, halomethyl, alkyl tosylate ether, epoxide, and combinations thereof.

8. The method of claim 1, wherein the cross-linker comprises glyoxal.

9. The method of claim 8, wherein the cross-linker is in a range from about 0.01 to about 8% by weight.

10. The method of claim 1, wherein the dry cellulose ether formulation comprises from about 50 to about 99% by weight of the cross-linked cellulose ether.

11. The method of claim 1, wherein the step of wetting the dry cellulose ether formulation is conducted in an eductor-mixer system.

12. The method of claim 1, wherein the step of wetting the dry cellulose ether formulation is conducted in a Venturi mixer.

13. A method for dispersing a dry cellulose ether powder in an aqueous solution without forming lumps, comprising the steps of:
(a) feeding the dry cellulose ether powder to a feeder at an adjustable rate;
(b) wetting the dry cellulose ether powder with a hydration agent and an acid solution;
(c) mixing the wetted cellulose ether with additional hydration agent in a mixer; and
(d) forming a uniform and clear solution.

14. The method of claim 13, wherein the cellulose ether is selected from the group consisting of hydroxyethyl cellulose (HEC), hydroxypropyl cellulose (HPC), water soluble ethylhydroxyethyl cellulose (EHEC), carboxymethyl cellulose (CMC), carboxymethylhydroxyethyl cellulose (CMHEC), hydroxypropylhydroxyethyl cellulose (HPHEC), methylcellulose (MC), methylhydroxypropyl cellulose (MHPC), methylhydroxyethyl cellulose (MHEC), carboxymethylmethylcellulose (CMMC), hydrophobically modified carboxymethylcellulose (HMCMC), hydrophobically modifiedhydroxyethyl cellulose (HMHEC), hydrophobically modified hydroxypropyl cellulose (HMHPC), hydrophobically modified ethylhydroxyethyl cellulose (HMEHEC), hydrophobically modified carboxymethylhydroxyethyl cellulose (HMCMHEC), hydrophobically modified hydroxypropylhydroxy ethyl cellulose (HMHPHEC), hydrophobically modified methyl cellulose (HMMC), hydrophobically modified methylhydroxypropyl cellulose (HMMHPC), hydrophobically modified methylhydroxyethyl cellulose (HMMHEC), hydrophobically modified carboxymethylmethyl cellulose (HMCMMC), cationic hydroxyethyl cellulose (cationic HEC) and cationic hydrophobically modified hydroxyethyl cellulose (cationic HMHEC).

15. The method of claim 13, wherein the acid solution comprises an organic acid or an inorganic acid.

16. The method of claim 13, wherein the acid solution comprises a partially neutralized acid.

17. The method of claim 13, wherein the step of wetting the dry cellulose ether powder is conducted in an eductor-mixer system.

18. A method for dispersing a dry cellulose ether formulation in an aqueous solution without forming lumps, comprising the steps of:
(a) feeding the dry cellulose ether formulation to a feeder at an adjustable rate;
(b) wetting the dry cellulose ether formulation with a hydration agent;
(c) mixing the wetted cellulose ether formulation with additional hydration agent in a mixer; and
(d) forming a uniform and clear solution,
wherein the dry cellulose ether formulation comprises (i) a cellulose ether cross-linked with a cross-linker having a first reactive moiety and a second reactive moiety, and (ii) a partially neutralized carboxylic acid selected from the group consisting of adipic acid, aldaric acid, citric acid, isocitric acid, tartaric acid, oxalic acid, malonic acid, maleic acid, itaconic acid, succinic acid, glutaric acid, pimelic acid, suberic acid, azelaic acid, sebacic acid, phthalic acid, aconitic acid, propane-1,2,3 tricarboxylic acid, trimethic acid, polyacrylic acid, polymethacrylic acid, and combinations thereof.

19. The method of claim 18, wherein the partially neutralized carboxylic acid is partially neutralized citric acid.

* * * * *